US006248835B1

(12) United States Patent
Gownder et al.

(10) Patent No.: US 6,248,835 B1
(45) Date of Patent: Jun. 19, 2001

(54) POLYPROPYLENE/POLYSTYRENE POLYMER BLEND, IMPROVED FIBERS PRODUCED FROM THE BLEND AND METHOD OF MANUFACTURING

(75) Inventors: Mohan Gownder, Odessa, TX (US); Baireddy Raghava Reddy, Edmond, OK (US); Jay Nguyen, Pasadena, TX (US)

(73) Assignee: Fina Technology, Inc., Houston, TX (US)

( * ) Notice: Subject to any disclaimer, the term of this patent is extended or adjusted under 35 U.S.C. 154(b) by 0 days.

(21) Appl. No.: 09/186,961

(22) Filed: Nov. 5, 1998

(51) Int. Cl.$^7$ ............................ C08L 23/00; C08L 23/04; D02G 3/00
(52) U.S. Cl. ..................... 525/240; 525/241; 57/244; 57/400; 428/373; 428/392; 428/394
(58) Field of Search .................................. 525/240, 241; 57/244, 400; 428/373, 392, 394

(56) References Cited

U.S. PATENT DOCUMENTS 5,616,412 * 4/1997 Lin ........................................ 428/373

FOREIGN PATENT DOCUMENTS 0194147  9/1986  (EP) .
0353386  2/1990  (EP) .

* cited by examiner

*Primary Examiner*—Nathan M. Nutter
(74) *Attorney, Agent, or Firm*—Jim D. Wheelington

(57) ABSTRACT

A polymer blend, fibers manufactured from the blend and method of producing the fibers is disclosed. The polymer blend includes from 92 wt % to 98.5 wt % of a base polypropylene having a melt flow rate of less than 20 g/10 min, and a maximum draw ratio D, a Crimp Stability of CS, when drawn into filaments at 1000 m/sec, and from 8 wt % to 1.5 wt % of an amorphous polystyrene having a melt flow rate of less than 15 g/10 min. The polymer blend is drawable at greater than 800 m/sec to produce filaments having a maximum draw ratio of $D_2$, the ratio of $D_2$: $D_1$, being greater than 1.15:1 and a Crimp Stability of $CS_2$, the ratio of $CS_2$: $CS_1$ being greater than 1.45. Preferably, the base polypropylene has a melt flow rate of between 8 and 15 g/10 min. In one embodiment, the amorphous polystyrene is characterized by a melt flow between 2 and 15 g/10 min., a tensile strength of between 6000 and 9000 psi, a modulus of between 250,000 and 500,000 psi, a flexural strength of between 8000 and 16,000 psi, a flexural modulus of between 300,000 and 500,000 psi, a Vicat softening point of between 180° F. and 240° F., and an annealed heat distortion of between 170° F and 220° F.

30 Claims, 4 Drawing Sheets

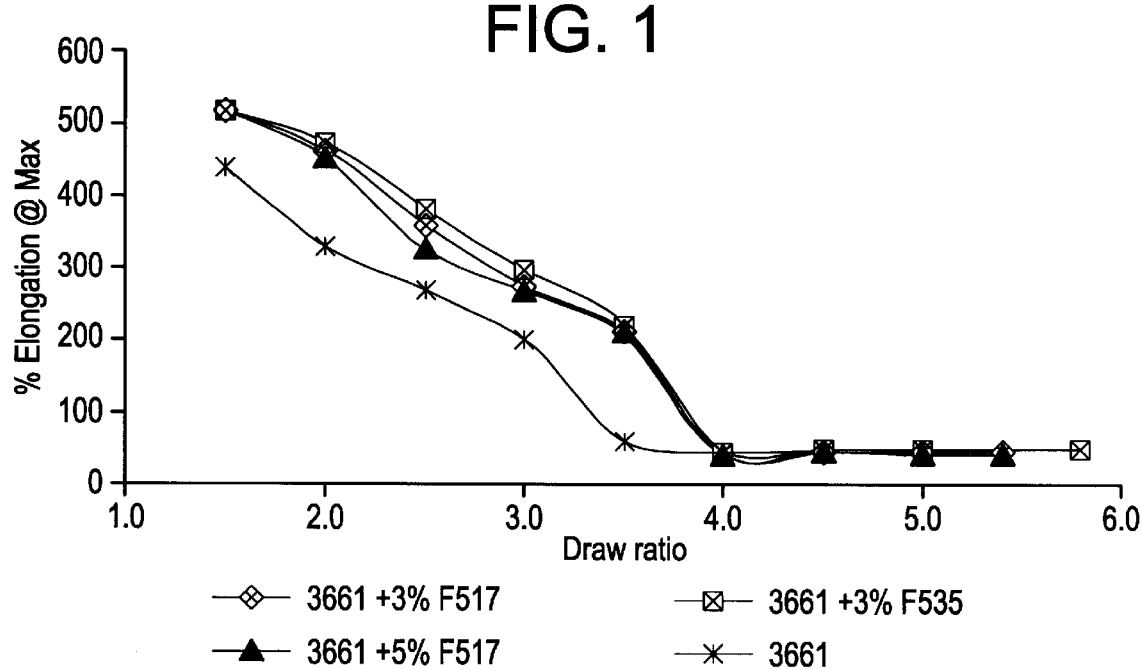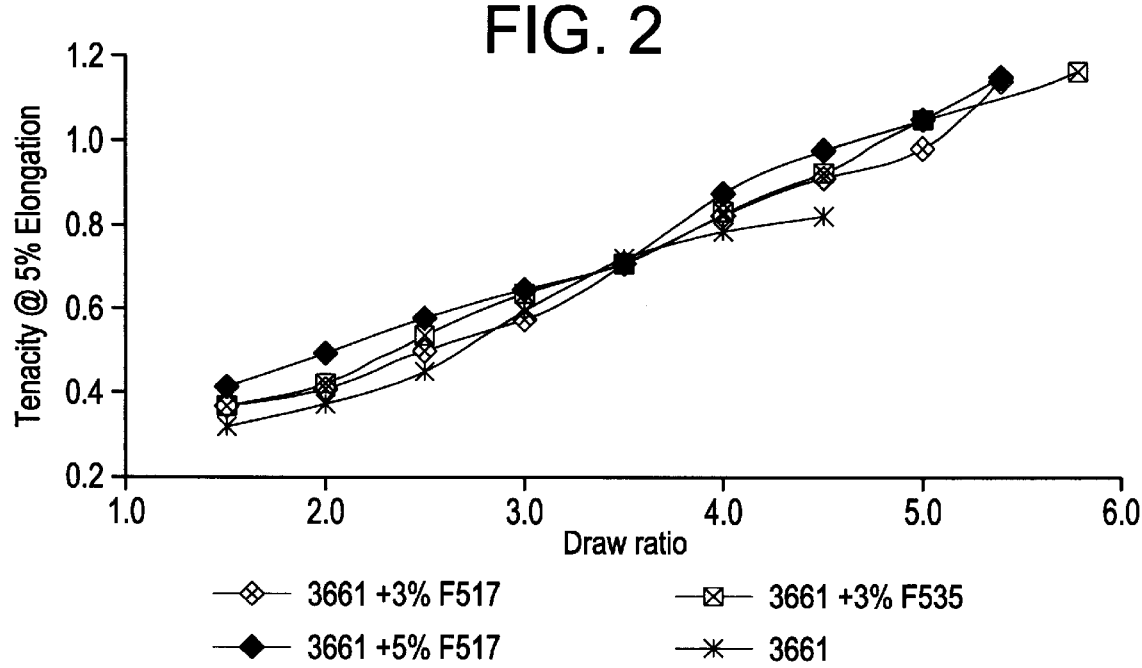

POLYPROPYLENE/POLYSTYRENE POLYMER BLEND, IMPROVED FIBERS PRODUCED FROM THE BLEND AND METHOD OF MANUFACTURING

BACKGROUND OF THE INVENTION

Without limiting the scope of the present invention, the background of the invention is described with reference to polymer blends, in particular, polymer blends useful and particularly adapted for the production of carpets and rugs. Due to widespread availability and economic factors, polypropylene is a material particularly suitable for use in carpet manufacture. However, polypropylene fiber, texturized and woven into carpets or rugs, typically does not possess all of the most desired properties for use as a material for carpet fibers.

In particular, polypropylene fibers, texturized and woven into carpets and rugs, typically do not possess the high resiliency characteristics of nylon or polyester fibers because of the relatively low glass transition temperature, ($T_g$), of the polypropylenes utilized to produce such fibers. Since the glass transition temperature of the polypropylenes utilized to produce carpet fibers is typically below room temperature, the molecular mobility of the polypropylene molecules is such that the fibers deform, without substantial recovery, in the direction of the applied load. Consequently the use of polypropylene fibers in the manufacture of carpets and rugs has been limited.

Typically, the glass transition temperature of commercially available polypropylene is in the range of 0° C. Thus, at room temperature, portions of polypropylene molecules, especially amorphous segments, retain mobility over a significant range of the segment length. Consequently, if a load is placed upon a carpet produced from polypropylene fibers at room temperature, the polypropylene molecules tend to relax in the direction of stress and retain the imposed deformation after the load is removed. One way of minimizing non-reversible fiber deformation is to raise the glass transition temperature of the polymer. If the glass transition temperature of the material can be increased, the effect of segmental molecular deformations can be reduced or significantly reduced. Thus, if the glass transition temperature of the polymer is increased, the fiber will be more likely to recover from the deformation after the load is removed.

One way of increasing the glass transition temperature of a polymer is to increase the size of the pendant groups on the polymer backbone. For example, in the case of polypropylene, increasing the glass transition temperature could theoretically be accomplished by replacing some of the pendant methyl groups with larger pendant groups. One way of achieving this result would be to copolymerize propylene with bulkier olefins. However, as a practical matter, copolymerization with a higher olefin is not necessarily a commercially feasible solution due to numerous factors, including loss of productivity due to decreased polymerization rates and a decrease in the control over the physical properties of the resulting copolymer.

Another approach to increasing the glass transition temperature of polypropylene is to physically mix another polymer with a higher glass transition temperature with the polypropylene. The added polymer must, however, be physically compatible with polypropylene and economically feasible to use in the desired application. Because physical mixtures of different polymers adhere to each other via secondary bonding forces, the chemical composition, crystal structure, morphology and molecular weight all impact on the compatibility of the polymers. Finally, the polymer blend should be adaptable to processing, utilizing existing process equipment and conditions.

One article, Gupta et al., "Processability and properties of yarns made from polypropylene containing small amounts of polystyrene", *J. Appl. Polm. Sci.* 60, 1952 (1996), reports higher drawability and elongation with the addition of polystyrene to polypropylene. However, the maximum draw ratio reported in the Gupta article was 5.1 at a wind up speed of 750 (m/sec). Additionally, the reported tenacity of the resultant fiber was relatively low and the reported thermal shrinkage of the fibers was relatively high.

Thus, there exists a need for an improved blended polypropylene for use in the manufacture of fibers, and in particular, polypropylene fibers that exhibit improved resiliency, tenacity, processability and thermal resistance.

SUMMARY OF THE INVENTION

In one embodiment, the present invention provides a polymer blend comprising from 92 wt % to 98.5 wt % of a base polypropylene having a melt flow rate of less than 30 g/10 min, and a maximum draw ratio $D_1$ and a Crimp Stability of $CS_1$ when drawn into filaments at 1000 m/sec and from 8 wt % to 1.5 wt % of an amorphous polystyrene having a melt flow rate of less than 15 g/10 min. The polymer blend is drawable at greater than 800 m/sec to produce filaments having a maximum draw ratio of $D_2$ the ratio of $D_2$: $D_1$ being greater than 1.15:1 and a Crimp Stability of $CS_2$, the ratio of $CS_2$: $CS_1$ being greater than 1.45. Preferably, the base polypropylene has a melt flow rate of between 8 and 30 g/10 min. More preferably, the base polypropylene has a melt flow rate of between 10 and 14 g/10 min. Most preferably, the base polypropylene has a melt flow rate of about 12 g/10 min.

The base polypropylene is characterized by a density between about 0.904 and 0.906 g/cc., and fibers produced from the base polypropylene exhibit a tenacity of about 4.0 g/denier and an elongation of about 35%. The base polypropylene is further characterized by a tensile strength of between 4000 and 6000 psi, a modulus of between 250,000 and 500,000 psi, a Vicat softening point of between 150° C. and 220° C., and a DSC melting point between 150° C. and 180° C.

The base polypropylene is blended with an amorphous polystyrene having a melt flow between 2 and 15 g/10 min., a tensile strength of between 6000 and 9000 psi, a modulus of between 250,000 and 500,000 psi, a flexural strength of between 8000 and 16,000 psi, a flexural modulus of between 300,000 and 500,000 psi, a Vicat softening point of between 180° F. and 240° F., and an annealed heat distortion of between 170° F. and 220° F. Preferably, the polymer blend comprises from 2 wt % to 6 wt % of the amorphous polystyrene. More preferably, the polymer blend comprises from about 3 wt % to 5 wt % of an amorphous polystyrene.

In another aspect, the present invention provides a method of producing fibers and bulk continuous filament including the steps of:

(1) blending from 92 wt % to 98.5 wt % of a base polypropylene having a melt flow rate of less than 20 g/10 min, a maximum draw ratio $D_1$ and a Crimp Stability of $CS_1$ when drawn into filaments at 1000 m/sec;

(2) from 8 wt % to 1.5 wt % of an amorphous polystyrene having a melt flow rate of less than 15 g/10 min to produce a polymer blend. The polymer blend is drawable at greater than 800 m/sec to produce filaments having a maximum draw ratio of $D_2$, the ratio of $D_2$: $D_1$ being greater than 1.15:1 and a Crimp Stability of $CS_2$, the ratio of $CS_2$: $CS_1$ being greater than 1.45. The method includes the step of heating the polymer blend to a melt temperature between 220° C. and 240° C. and spinning the blend into filaments at a speed of between 500 m/sec and 3000 m/sec, preferably at a rate of about 1000 m/sec.

In another embodiment, the present invention provides a polymer fiber or filament produced from a polymer blend comprising:

(1) from 92 wt % to 98.5 wt % of a base polypropylene having a melt flow rate of less than 20 g/10 min, and a maximum draw ratio $D_1$ and a Crimp Stability of $CS_1$ when drawn into filaments at 1000 m/sec; and (2) from 8 wt % to 1.5 wt % of an amorphous polystyrene having a melt flow rate of less than 15 g/10 min.

The fibers or filaments may be drawn at greater than 800 m/sec to produce filaments having a maximum draw ratio of $D_2$, the ratio of $D_2$: $D_1$ being greater than 1.15:1 and a Crimp Stability of $CS_2$, the ratio of $CS_2$: $CS_1$ being greater than 1.45.

BRIEF DESCRIPTION OF THE DRAWINGS

For a more complete understanding of the present invention, including its features and advantages, reference is now made to the detailed description of the invention, taken in conjunction with the accompanying drawings in which like numerals identify like parts and in which:

FIG. 1 is a graph illustrating the percent elongation at the maximum draw ratios of fibers drawn from a base polypropylene and blends of the base polypropylene with different polystyrenes in accordance with the present invention;

FIG. 2 is a graph illustrating the tenacity at 5% elongation for a base polypropylene and blends of the base polypropylene with different polystyrenes in accordance with the present invention at various draw ratios;

DETAILED DESCRIPTION OF THE INVENTION

Figure 3:
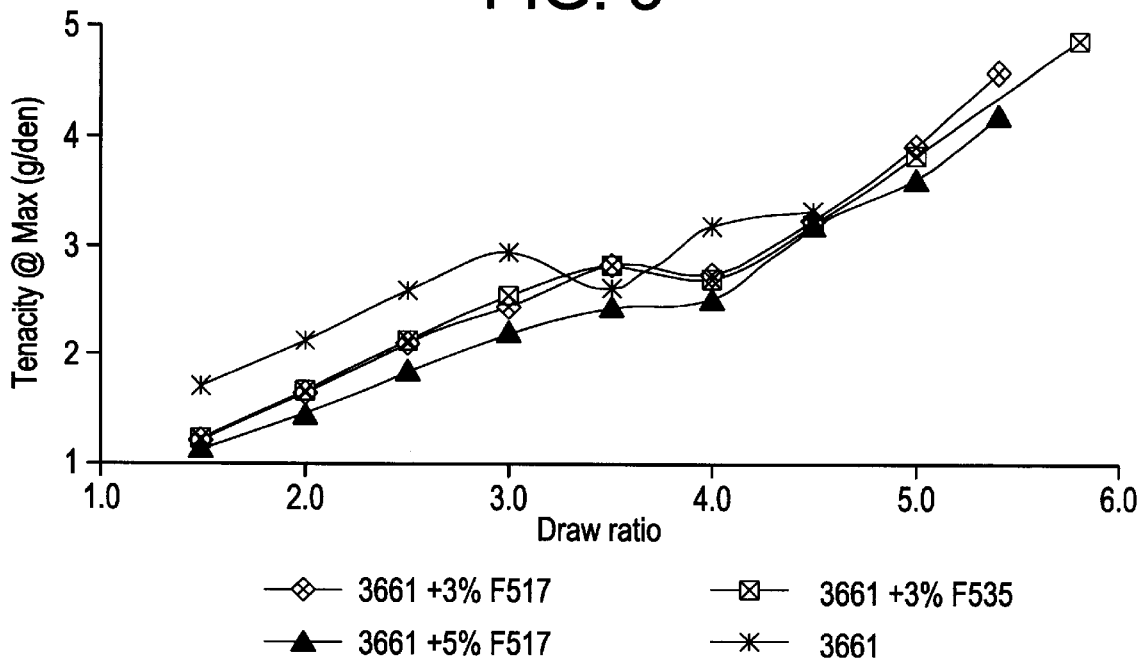
FIG. 3 is a graph illustrating the tenacity of a base polypropylene and blends of the base polypropylene with different polystyrenes in accordance with the present invention at various draw ratios.

While the making and using of various embodiments of the present invention are discussed in detail below, it should be appreciated that the present invention provides many applicable inventive concepts which can be embodied in a wide variety of specific contexts. The specific embodiments discussed herein are merely illustrative of specific ways to make and use the invention, and do not limit the scope of the invention.

As set forth in detail below, the present invention includes a blend of an isotactic polypropylene and polystyrene suitable for production of fibers, in particular, carpet fibers. As used herein, the terms "fiber" and "filament" refer generally to staple fibers and bulk continuous filament yarns. The polymer blend and fibers produced from the polymer blends disclosed herein are demonstrably superior to prior art blends and fibers. The polymer blend of the present invention provides greater drawability and improved processing properties. Fibers produced from the blend possess superior tenacity, elongation and lower thermal shrinkage. The method of the invention provides fibers uniquely adapted to the production of rugs and carpets.

Without being bound to any particular theory, it is believed that the combination of a base isotactic polypropylene with a melt flow rate of less than 30 g/10 min., (ASTM D-1238, Condition "L"), with an atactic crystal polystyrene having a melt flow rate of less than about 15 g/l10 min., (ASTM D-1238), results in a polymer blend that provides superior properties when drawn into filaments suitable for use in the production of carpets, rugs and related products. Preferably, the base polypropylene is an isotactic polymer having a melt flow rate of between about 8 and 15 g/10 min, (ASTM D- 1238 Condition "L"). More preferably, the base isotactic polypropylene homo or copolymer exhibits a melt flow rate between 10 and 14 g/10 min. Most preferably, the base isotactic polypropylene has a melt flow rate of about 12 g/ 10 min. The base polypropylene is characterized by a density between about 0.904 and 0.906 g/cc. Fibers produced from the base isotactic polypropylene typically exhibit a tenacity in the range of 4.0 g/denier (ASTM D-3218) and elongation of about 35%. (ASTM D3218). The term "base polypropylene" as used herein encompasses propylene homopolymers as well as propylene copolymers and blends of polypropylene homo and copolymers blended with minor amounts of other polymers, extenders, additives, coloring agents, slip and block agents, and the like.

In one embodiment of the invention, a base isotactic polypropylene homo or copolymer having a tensile strength of between 4000 and 6000 psi, (ASTM D-638), a modulus of between 250,000 and 500,000 psi, (ASTM D-638), a Vicat softening point of between 150° C. and 220° C., (ASTM D-1525), and a DSC melting point between 150° C. and 180° C. is blended with a minor amount, from about one and one-half (1.5) to about seven (8) weight percent of an atactic crystal polystyrene. The term "crystal atactic polystyrene" as used herein refers to a substantially transparent amorphous polystyrene. The atactic crystal polystyrene is characterized by a melt flow (ASTM D-1238) between about 2 and 15 g/10 min., a tensile strength of between 6000 and 9000 psi (ASTM D-638), a modulus of between 250,000 and 500,000 psi (ASTM D-638), a flexural strength of between 8000 and 16,000 psi (ASTM D-790), a flexural modulus of between 300,000 and 500,000 psi (ASTM D-790), a Vicat softening point of between 180° .F and 240° F. (ASTM D-1525), and an annealed heat distortion of between 170° F. and 220° F. (ASTM D-648).

In the process of the present invention, a base isotactic polypropylene homo or copolymer, having the above-described chemical and physical properties, is dry blended with a crystal atactic polystyrene, having the above-described physical and chemical properties, in amounts of from about one and one-half (1.5) to about eight (8) weight percent. In a more preferred embodiment, from about two (2) to about six (6) weight percent of the polystyrene is blended with the polypropylene homo or copolymer. In a most preferred embodiment, from about three (3) to five (5) percent by weight of the atactic crystal polystyrene is blended with the polypropylene homo or copolymer to produce a polymer blend for production of fibers or filaments suitable for the production of carpets, rugs and similar products.

The blended polystyrene/polypropylene mix is fed to a conventional extruder for heating and mixing. The blended polymer mixture is heated to a melt temperature between 220° C. and 240° C. and spun into filaments or fibers through a conventional Foume apparatus. A rectangular spinnerette with 120 trilobal holes (0.3/0.7 mm) is used to spin fibers from the melt. The spun filaments are quenched in cool air (10° C.) at 1.5 mBar. Godet temperatures are maintained with G1 between 110° C. and 130° C. while G2 is maintained between 40° C. and 70° C. The filaments are spun at a melt temperature of between 220° C. and 240° C. The filaments are produced at a speed of between 500 m/sec and 3000 m/sec with the draw ratio controlled by varying the first Godet, (G1), speed. The denier of the filaments may be varied between about 2000 and about 3000. In one embodiment, the denier of the filaments is maintained at about 2400. Preferably, the filaments are spun at a temperature of 230° C. and drawn at a rate of 1000 m/sec.

While not to be construed as limiting the invention to any specific embodiment or embodiments, exemplary material blends, processes and product of the invention are described in detail below.

Materials

Polymer blends suitable for use in connection with the present invention include polypropylene homopolymers and copolymers generally suited for the production of fibers used in carpet manufacture along with crystal polystyrenes. One material suited for use in connection with the present invention is an isotactic polypropylene homopolymer commercially available from Fina Oil and Chemical Company ("Fina") under the trade designation 3661. Polypropylene 3661 may be blended with amorphous crystal polystyrenes to produce the polymer blend of the present invention. Two polystyrenes suitable for use in the practice of the present invention are commercially available from Fina under the trade designations 517 and 535. Polystyrene 517 contains approximately 4.5 wt % mineral oil.

The polypropylene homo or copolymer may be blended with atactic crystal polystyrenes to form a polymer blend for producing carpet fibers in accordance with the present invention. In one embodiment of the invention, from about one and one-half (1.5) to about eight (8) weight percent of the atactic crystal polystyrene is blended with the polypropylene homo or copolymer. More preferably, from about two (2) to about six (6) weight percent of the polystyrene may be blended with the polypropylene homo or copolymer to produce polymer blends exhibiting the advantageous properties of the invention. Most preferably, three (3) to five (5) percent by weight of the polystyrene is blended with the polypropylene homo or copolymer to produce a polymer blend for production of carpet fabrics embodying the invention. Additionally, the polymers may contain nominal amounts of antioxidants, slip and block agents, and coloring agents, depending upon the particular application. Nominal properties of the 3661 polypropylene, the 517 polystyrene and the 535 polystyrene are set forth below:

| Polypropylene 3661 | |
|---|---|
| Melt Flow ASTM - 1238 Condition L | 12.0 g/10 min. |
| Density ASTM - D1505 | 0.905 g/cm$^{\#}$ |
| Melting Point DSC | 165° C. |
| Tensile Modulus ASTM - 638 | 250,000 psi |
| Flexural Modulus ASTM D790 | 230,000 psi |
| Flexural Stiffness ASTM - D790 | 180,000 psi |
| Tenacity ASTM - D3218 | 4.0 g/denier |
| Maximum Drawability | 4.5:1 |
| Elongation ASTM D3218 | 35% |
| % LSS | 3.8 |
| % CCB | 19.9 |
| % CCA | 4.1 |
| % CR | 76.3 |
| % CS | 20.6% |

(LSS = Linear skein shrinkage)
(CCB = Crimp Contraction Before)
(CCA = Crimp Contraction After)
(CR = Crimp Recovery)
(CS = Crimp Stability)

| 517 polystyrene | |
|---|---|
| Melt Flow ASTM - D1238 | 13 g/10 min. |
| Tensile Strength ASTM - D638 | 5400 psi |
| Tensile Modulus ASTM - D638 | 380,000 psi |
| Flexural Strength ASTM - D790 | 9,800 psi |
| Flexural Modulus ASTM - D790 | 440,000 psi |
| Vicat Softening Point ASTM - D1525 | 195° F. |
| Heat Distortion Annealed ASTM - D648 units - | 182° F. |

| 535 polystyrene | |
|---|---|
| Melt Flow ASTM - D1238 | 4.0 g/10 min. |
| Tensile Strength ASTM - D638 | 7100 psi |
| Tensile Modulus ASTM - D638 | 390,000 psi |
| Flexural Strength ASTM - D790 | 14,000 |
| Flexural Modulus ASTM - D790 | 460,000 |
| Vicat Softening Point ASTM - D1525 | 222° F. |
| Heat Distortion Annealed ASTM - D648 | 208° F. |

EXAMPLE 1

Polypropylene 3661

Polypropylene 3661 was processed in a Fourne fiber line. A rectangular spinnerette with 120 trilobal holes (0.3/07 mm) was used to spin fibers from the melt. The filaments were quenched at 1.5 Mbar in cool air at 10° C. The Godet temperatures were maintained at G1 equal to 116° C. and G2 equal to 60° C. Spinning was performed at a melt temperature of 230° C.

Fully oriented yarn was produced with the second Godet operating at 1000 m/min and the draw ratio varied by changing the G1 speed. Samples were collected at various draw ratios until maximum draw while keeping the denier constant at about 2400. Shrinkage of the samples was measured at 121° C. Tenacity and Elongation were measured in accordance with ASTM D-3218. Linear Skein Shrinkage (LSS), Crimp Contraction Before (CCB), Crimp Contraction After (CCA), Crimp Recovery (CR) and Crimp Stability (CS) were determined in an experimental procedure utilized to evaluate the crimp properties of the fibers produced in accordance with the present invention. The test procedure is based upon recommendations of the Textured Yarn Association of America.

The sample fiber is a 10 meter length fiber wound to a 1 meter circumference as represented below. The sample is suspended on a hook attached to a stand. "C" indicates the length of the crimped specimen and "L" indicates the length of the specimen after a 500 g. weight is hung on the specimen. Measurements are taken before and after placing the specimen in an oven for five (5) minutes at 121° C. A schematic representation of the test procedure along with the equations used to calculate Linear Skein Shrinkage (% LSS); Crimp Contraction Before (% CCB); Crimp Contraction After (%. CCA); Crimp Recovery (% CR); and, Crimp Stability (% CS) are presented below:

Before Oven→5min@121° C. →After Oven.

| Before Oven | | Oven* | | After Oven |
|---|---|---|---|---|
| / | / | / | / | / |
| / | / | / | / | / |
| / | / | / | / | / |
| $C_b$ | / | / | $L_a$ | $C_c$ |
| | $L_b$ | $C_a$ | | |

*5 min @ 121° C.

In above schematic, $C_b$ represents the length of the unloaded crimped specimen before heating in the oven; $L_b$ represents the length of the specimen with a 500 g. weight applied, again, before heating in the oven; $C_a$ represents the length of the unloaded specimen after heating in the oven; $L_a$ represents the length of the specimen after heating with a 500 g. weight applied; and $C_c$ represents the length of the specimen after the 500 g. weight has been removed.

EQUATIONS:
% Linear Skein Shrinkage (LSS)=$((L_b-L_a)/L_b)\times 100$
% Crimp Contraction Before (CCB)=$((L_b-C_b)/L_b)\times 100$
% Crimp Contraction After (CCA)=$((L_a-C_a)/L_a)\times 100$
% Crimp Recovery (CR)=$((L_b-C_c)/(L_a-100$
% Crimp Stability (CS)=CCA/CCB$\times 100$ Samples of fibers drawn from the 3661 polypropylene were tested and the results are set forth in Table 1 below.

TABLE 1

| Tenacity @ Draw Ratio | |
|---|---|
| @ 3:1 | 2.9 g/denier |
| @ 4:1 | 3.2 g/denier |
| @ 5:1 | — |
| Maximum Draw Ratio | 4.5 |
| % Elongation @ Draw Ratio | |
| @ 3:1 | 196.0 |
| @ 4:1 | 39.0 |
| @ 5:1 | — |
| % LSS | 3.8 |
| % CCB | 19.9 |
| % CCA | 4.1 |
| % CR | 76.3 |
| % CS | 20.6 |

(LSS = Linear skein shrinkage)
(CCB = Crimp Contraction Before)
(CCA = Crimp Contraction After)
(CR = Crimp Recovery)
(CS = Crimp Stability)

EXAMPLE 2

Polypropylene 3661 with 3% Polystyrene 517

A mixture of polypropylene 3661 with three (3) percent by weight polystryene 517 was dry blended, processed, sampled and tested as described in connection with Example 1 above. Results of the tests are set forth in Table 2 below:

TABLE 2

| Maximum Draw Ratio | 5.4 |
|---|---|
| Tension @ Maximum Draw Ratio | 4.7 |
| Tenacity @ Draw Ratio | |
| @ 3:1 | 2.4 |
| @ 4:1 | 2.8 |
| @ 5:1 | 3.9 |
| % Elongation @ Draw Ratio | |
| @ 3:1 | 270.0 |
| @ 4:1 | 42.0 |
| @ 5:1 | 38.0 |
| % LSS | 2.7 |
| % C.B. | 16.2 |
| % CCA | 4.7 |
| % CR | 82.2 |
| % CS | 29.1 |

(LSS = Linear skein shrinkage)
(C.B. = Crimp Contraction Before)
(CCA = Crimp Contraction After)
(CR = Crimp Recovery)
(CS = Crimp Stability)

EXAMPLE 3

Polypropylene 3661 with 5% Polystyrene 517

A mixture of polypropylene 3661 with five (5) percent by weight polystyrene 517 was dry blended, processed, sampled and tested as described in connection with Example 1 above. Results of the tests are set forth in Table 3 below:

TABLE 3

| Maximum Draw Ratio | 5.4 |
|---|---|
| Tension @ Maximum Draw Ratio | 4.2 |
| Tenacity @ Draw Ratio | |
| @ 3:1 | 2.2 |
| @ 4:1 | 2.5 |

TABLE 3-continued

| | |
|---|---|
| @ 5:1 | 3.6 |
| % Elongation @ Draw Ratio | |
| @ 3:1 | 263.0.0 |
| @ 4:1 | 37.0 |
| @ 5:1 | 36.0 |
| % LSS | 3.2 |
| % C.B. | 12.1 |
| % CCA | 4.0 |
| % CR | 80.8 |
| % CS | 33.0 |

(LSS = Linear skein shrinkage)
(C.B. = Crimp Contraction Before)
(CCA = Crimp Contraction After)
(CR = Crimp Recovery)
(CS = Crimp Stability)

EXAMPLE 4

Polypropylene 3661 with 3% Polystyrene 535

A mixture of polypropylene 3661 with three (3) percent by weight polystyrene 535 was dry blended, processed, sampled and tested as described in connection with Example 1 above. Results of the tests are set forth in Table 4 below:

TABLE 4

| | |
|---|---|
| Maximum Draw Ratio | 5.8 |
| Tension @ Maximum Draw Ratio | 4.9 |
| Tenacity @ Draw Ratio | |
| @ 3:1 | 2.5 |
| @ 4:1 | 2.7 |
| @ 5:1 | 3.9 |
| % Elongation @ Draw Ratio | |
| @ 3:1 | 293.0.0 |
| @ 4:1 | 43.0 |
| @ 5:1 | 41.0 |
| % LSS | 3.6 |
| % C.B. | 15.7 |
| % CCA | 4.9 |
| % CR | 84.1 |
| % CS | 31.0 |

(LSS = Linear skein shrinkage)
(C.B. = Crimp Contraction Before)
(CCA = Crimp Contraction After)
(CR = Crimp Recovery)
(CS = Crimp Stability)

Referring now to FIG. 1, a graph illustrating the percent elongation at the maximum draw ratios of fibers drawn from a base polypropylene (3661) and blends of the base polypropylene with different polystyrene (517 and 535) is presented. As illustrated, the elongation of fibers produced from the blends of the base polypropylene with the polystyrene is superior up to draw ratios of 4.0:1.

Turning now to FIG. 2, the tenacity of fibers drawn from a base polypropylene (3661) at 5% elongation is illustrated along with the tenacities of blends of the base polypropylene with two different polystyrene (517 and 535) at various draw ratios. As illustrated, the tenacities of fibers produced from the base polypropylene, blended with the polystyrene, increase as the fibers are produced at draw ratios in excess of the maximum draw ratio attainable with the base polypropylene alone.

Turning now to FIG. 3, the tenacity of a base polypropylene (3661) is shown and contrasted with and polypropylene/polystyrene blends of the present invention. FIG. 3 illustrates that while the tenacity of fibers drawn from the base polypropylene exceeds that of the polypropylene/polystyrene blends of the invention until fibers drawn from the base polypropylene are produced at the maximum drawability (4.5:1), the tenacity of the polypropylene/polystyrene blends of the invention increase with draw ratio and reach a maximum of 5 g/den. for the mixture of base polypropylene 3661 with polystyrene 535.

Figure 4:
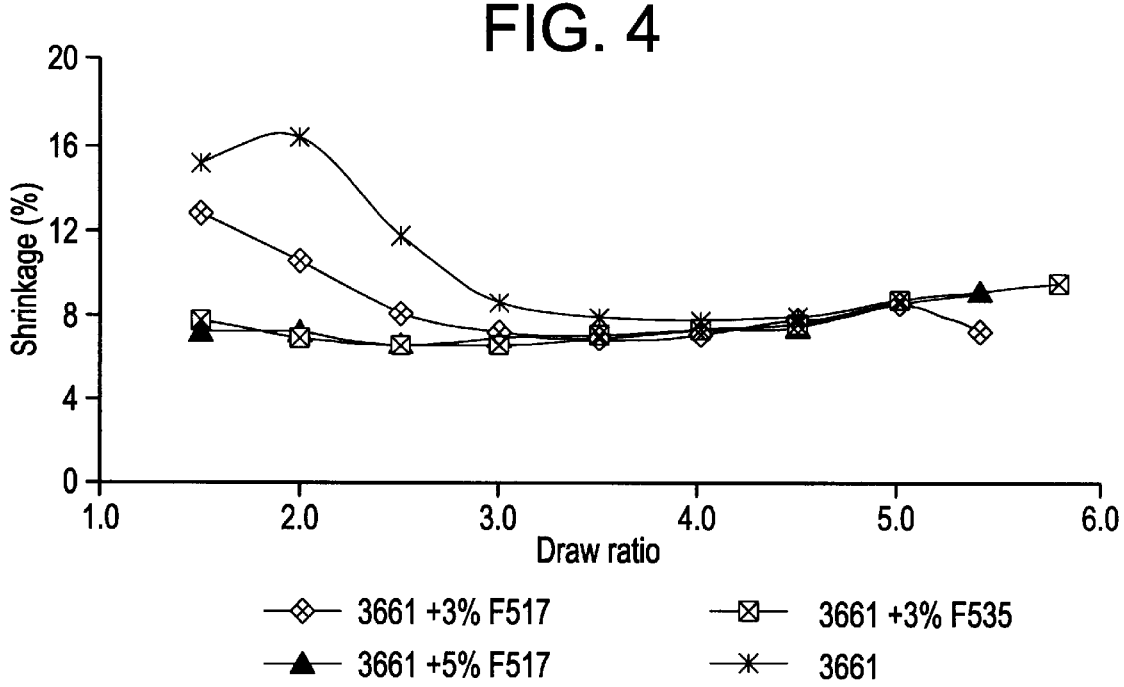
FIG. 4 is a graph illustrating the shrinkage of fibers drawn at various draw ratios from a base polypropylene and blends of the base polypropylene different polystyrenes in accordance with the present invention.

Referring now to FIG. 4, a graph is presented illustrating the comparative shrinkage of fibers drawn from the base polypropylene and blends of the base polypropylene with polystyrene 517 and 535. As shown, the propylene/polystyrene blends exhibit lower shrinkage at low draw rates. At higher draw ratios, the shrinkage is similar for fibers produced from the base polypropylene and the polypropylene/polystyrene blends. This result is surprising since the addition of an amorphous polystyrene would be anticipated to reduce the crystallizability of polypropylene fibers which, in turn, would be expected to increase fiber shrinkage.

Figure 5:
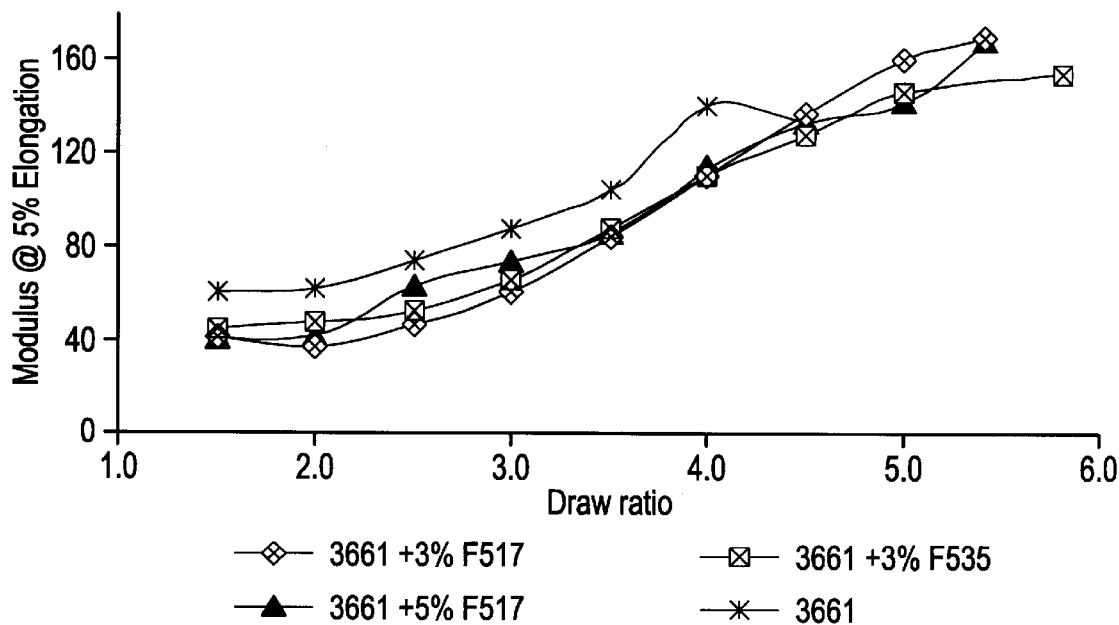
FIG. 5 is a graph illustrating the modulus at 5% elongation of fibers produced at various draw ratios, drawn from a base polypropylene and blends of the base polypropylene with different polystyrenes in accordance with the present invention.

FIG. 5 illustrates the modulus at 5% elongation of fibers drawn from the base polypropylene and polypropylene/polystyrene blends of the present invention. As illustrated, the modulus of fibers drawn from the base polypropylene exceeds the moduli of fibers drawn from the blends of the base polypropylene with polystyrene up to the maximum draw ratio of the base polypropylene. However, as shown, at draw ratios above the maximum draw ratio of the base polypropylene, the modulus of fibers drawn from the polypropylene/polystyrene blends increases.

Figure 6:
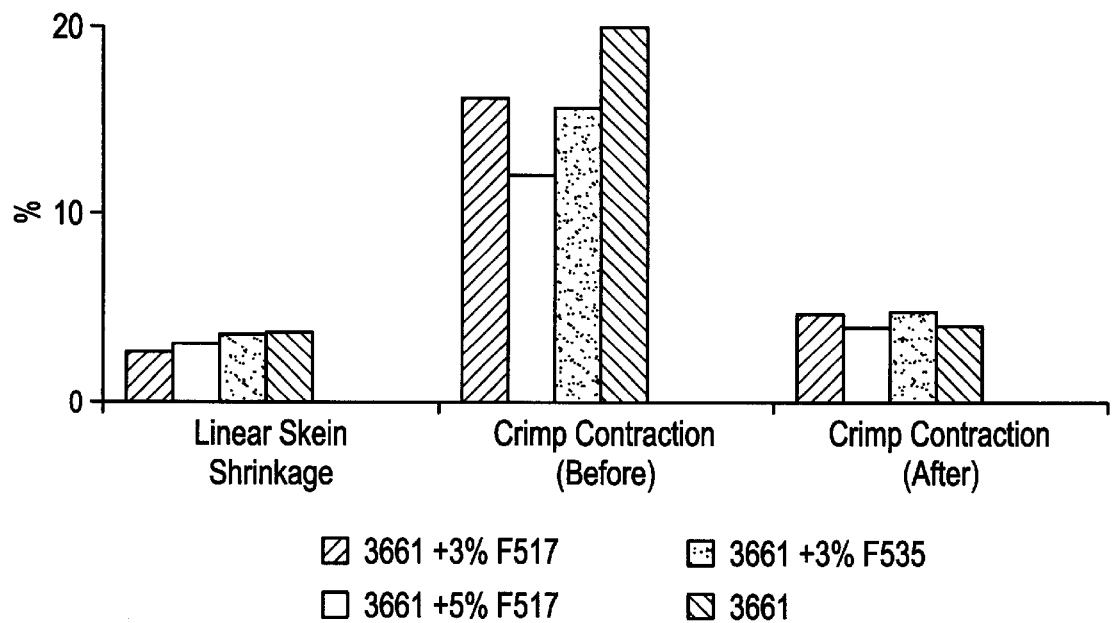
FIG. 6 is a bar graph presenting a comparative illustration of the Linear Skein Shrinkage and Crimp Contraction, before and after heat treating of fibers drawn from a base polypropylene and blends of the base polypropylene with different polystyrenes in accordance with the present invention.
Figure 7:
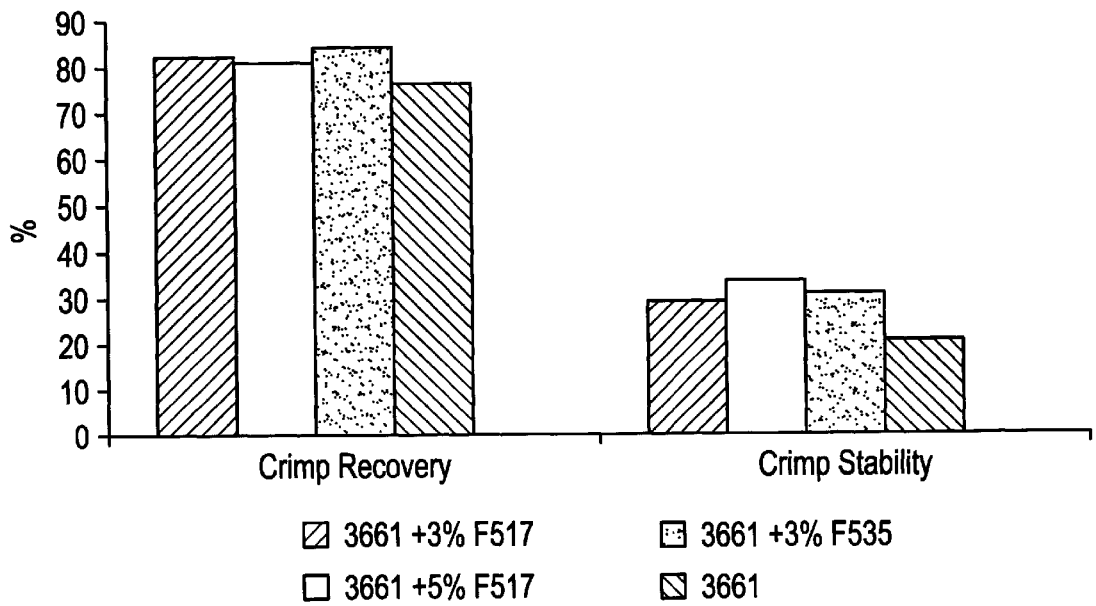
FIG. 7 is a bar graph presenting a comparative illustration of the Crimp Recovery and Crimp Stability of fibers drawn from a base polypropylene and blends of the base polypropylene with different polystyrenes in accordance with the present invention.

Turning now to FIGS. 6 and 7, the Linear Skein Shrinkage (LSS) and Crimp Contraction Before (CB) of the polypropylene/polystyrene blends is slightly lower than the comparable values for the base polypropylene. However, the values of Crimp Contraction After (CCA), Crimp Recovery (CR) and Crimp Stability (CS) are higher for fibers prepared from the polypropylene/polystyrene blends. In particular, the fibers prepared from the polypropylene/polystyrene blends exhibited significantly higher Crimp Stability as best illustrated in FIG. 7. The improvement in resiliency, e.g., CCA, CR and CS, evidences an apparent increase in the glass transition temperatures of the blended materials. Consequently, fibers produced from the blend will be more likely to recover from load deformation after the load is removed.

Figure 8:
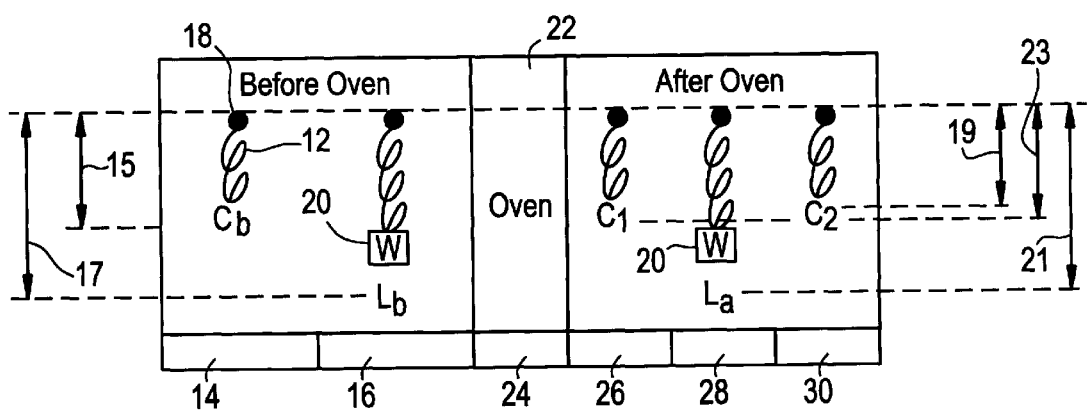
FIG. 8 is a schematic drawing illustrating the steps in test procedures utilized to evaluate properties of the fibers of the present invention.

Referring now to FIG. 8, a schematic illustration of the test procedure utilized to determine values for Linear Skein Shrinkage (LSS), Crimp Contraction Before (C.B.), Crimp Contraction After (CCA), Crimp Recovery (CR) and Crimp Stability (CS) is illustrated. The procedure utilized to determine the crimp properties of the fibers was based upon recommendations of the Textured Yarn Association of America.

According to the procedure, a 10 meter length specimen of fiber 12 is coiled to a 1 meter circumference in step 14. The sample is suspended on a hook 18 attached to a stand in step 16. As illustrated, "$C_b$" indicates the length 15 of the crimped specimen and "$L_b$" indicates the length 17 of the specimen after a 500 g. weight 20 is hung on the specimen. The specimen is heated in oven 22 for (5) minutes at 121° C. in step 24. The specimen is measured in step 26 after heating in the oven to obtain values for "$C_a$" the length 19 of the crimped specimen after heating. A 500 g. weight 20 is hung on the specimen and the value of "$L_a$" 21 is determined in step 28. A final measurement $C_c$ 23 is taken in step 30 for the purpose of calculating the Crimp Recovery of the fiber. The equations used to calculate the various parameters determined in the above test procedure are set forth above.

As illustrated, the polymer blend is drawable at greater than 800 m/sec to produce filaments having a maximum draw ratio of $D_2$. Compared to the maximum draw ratio of the base polypropylene ($D_1$), the polymer blend of the invention is drawable at significantly higher draw ratios than the base polymer. The polymer blend is drawable at greater than 800 m/sec to produce filaments having a maximum draw ratio of $D_2$, the ratio of $D_2$:$D_1$ being greater than 1.15:1. As illustrated in the above embodiments, the ratio of $D_2$:$D_1$ ranges from 1.2:1 to 1.29:1.

Further, the polymer blend of the invention produces fibers or filaments having increased Crimp Stability (CS). As shown above, the Crimp Stability of the base polymer ($CS_1$) is in the range of 20 whereas the Crimp Stability of the blended polymer, ($CS_2$) is in the range of 29 to 33. Thus, the ratio of the Crimp Stability of the blended polymer to that of the base polymer, $CS_2$: $CS_1$, is greater than 1.45:1. In the embodiments of the invention described above, the ratio $CS_2$: $CS_1$ ranges from 1.41:1 to 1.61:1. Thus, fibers and filaments produced from the blend of the invention possess superior properties and may be advantageously utilized in the production of carpets, rugs and related products.

The polymer blend and fibers produced from the blend disclosed herein possess and exhibit substantial advantages over prior art blends and fibers. In particular, fibers drawn from the polymer blends of the present invention exhibit greater drawability and enhanced processing capabilities as compared to prior art blends. Further, fibers produced from the blends of the invention possess superior tenacity, elongation and lower thermal shrinkage.

While certain embodiments of the invention have been illustrated for the purposes of this disclosure, numerous changes in the composition, method and article of manufacture presented herein may be made by those skilled in the art, such changes being embodied within the scope and spirit of the present invention as defined by the appended claims.

What is claimed is:

1. A polymer blend comprising:
   from 92 wt % to 98.5 wt % of a base polypropylene having a melt flow rate of less than 30 g/10 min; and
   about 3 wt % of an amorphous polystyrene having a melt flow rate of about 4 g/10 min.

2. The polymer blend of claim 1 wherein the base polypropylene has a melt flow rate of between 8 and 15 g/10 min.

3. The polymer blend of claim 1 wherein the base polypropylene has a melt flow rate of between 10 and 14 g/10 min.

4. The polymer blend of claim 1 wherein the base polypropylene has a melt flow rate of about 12 g/10 min.

5. The polymer blend of claim 1 wherein the polymer blend comprises from 2 wt % to 6 wt % of an amorphous polystyrene.

6. The polymer blend of claim 1 wherein the polymer blend comprises from about 3 wt % to 5 wt % of an amorphous polystyrene.

7. The polymer blend of claim 1 wherein the base polypropylene has a density between about 0.904 and 0.906 g/cc.

8. The polymer blend of claim 1 wherein fibers produced from the base polypropylene exhibit a tenacity of about 4.0 g/denier and an elongation of about 35%.

9. The polymer blend of claim 1 wherein the base polypropylene has a tensile strength of between 4000 and 6000 psi, a modulus of between 250,000 and 500,000 psi, a Vicat softening point of between 150° C. and 220° C., and a DSC melting point between 150° C. and 180° C.

10. The polymer blend of claim 1 wherein the amorphous polystyrene has a melt flow between 2 and 15 g/10 min., a tensile strength of between 6000 and 9000 psi, a modulus of between 250,000 and 500,000 psi, a flexural strength of between 8000 and 16,000 psi, a flexural modulus of between 300,000 and 500,000 psi, a Vicat softening point of between 180° F. and 240° F., and an annealed heat distortion of between 170° F. and 220° F.

11. A method of producing fibers and bulk continuous filament comprising the steps of:
   blending from 92 wt % to 98.5 wt % of a base polypropylene having a melt flow rate of less than 30 g/10 min with;
   about 3 wt % of an amorphous polystyrene having a melt flow rate of about 4 g/10 min to produce a polymer blend; and
   heating the polymer blend to a melt temperature between 220° C. and 240° C. and spinning the blend into filaments at a draw ratio of between 500 m/sec and 3000 m/sec.

12. The method of claim 11 wherein the base polypropylene has a melt flow rate of between 8 and 30 g/10 min.

13. The method of claim 11 wherein the base polypropylene has a melt flow rate of between 10 and 14 g/10 min.

14. The method of claim 11 wherein the base polypropylene has a melt flow rate of about 12 g/10 min.

15. The method of claim 11 wherein the polymer blend comprises from 2 wt % to 6 wt % of an amorphous polystyrene.

16. The method of claim 11 wherein the polymer blend comprises from about 3 wt % to 5 wt % of an amorphous polystyrene.

17. The method of claim 11 wherein the base polypropylene has a density between about 0.904 and 0.906 g/cc.

18. The method of claim 11 wherein fibers produced from the base polypropylene exhibit a tenacity of about 4.0 g/denier and an elongation of about 35%.

19. The method of claim 11 wherein the base polypropylene has a tensile strength of between 4000 and 6000 psi, a modulus of between 250,000 and 500,000 psi, a Vicat softening point of between 150° C. and 220° C., and a DSC melting point between 150° C. and 180° C.

20. The method of claim 11 wherein the amorphous polystyrene has a melt flow between 2 and 15 g/10 min., a tensile strength of between 6000 and 9000 psi, a modulus of between 250,000 and 500,000 psi, a flexural strength of between 8000 and 16,000 psi, a flexural modulus of between 300,000 and 500,000 psi, a Vicat softening point of between 180° F. and 240° F., and an annealed heat distortion of between 170° F. and 220° F.

21. A polymer fiber; the polymer fiber produced from a polymer blend comprising:
   (a) from 92 wt % to 98.5 wt % of a base polypropylene having a melt flow rate of less than 30 g/10 min, and a maximum draw ratio $D_1$ and a Crimp Stability of $CS_1$ when drawn into filaments at 1000 m/sec]; and
   (b) about 3 wt % of an amorphous polystyrene having a melt flow rate of about 4 g/10 min;
   the polymer blend being drawable at greater than 800 m/sec to produce filaments having a maximum draw ratio of $D_2$, the ratio of $D_2$:$D_1$ being greater than 1.5:1 and a Crimp Stability of $CS_2$ the ratio of $CS_2$:$CS_1$ being greater than 1.45].

22. The polymer fiber of claim 21 wherein the base polypropylene has a melt flow rate of between 8 and 30 g/10 min.

23. The polymer fiber of claim 21 wherein the base polypropylene has a melt flow rate of between 10 and 14 g/10 min.

24. The polymer fiber of claim 21 wherein the base polypropylene has a melt flow rate of about 12 g/10 min.

25. The polymer fiber of claim 21 wherein the polymer blend comprises from 2 wt % to 6 wt % of an amorphous polystyrene.

26. The polymer fiber of claim 21 wherein the polymer blend comprises from about 3 wt % to 5 wt % of an amorphous polystyrene.

27. The polymer fiber of claim 21 wherein the base polypropylene has a density between about 0.904 and 0.906 g/cc.

28. The polymer fiber of claim 21 wherein fibers produced from the base polypropylene exhibit a tenacity of about 4.0 g/denier and an elongation of about 35%.

29. The polymer fiber of claim 21 wherein the base polypropylene has a tensile strength of between 4000 and 6000 psi, a modulus of between 250,000 and 500,000 psi, a Vicat softening point of between 150° C. and 220° C., and a DSC melting point between 150° C. and 180° C.

30. The polymer blend of claim 21 wherein the amorphous polystyrene has a melt flow between 2 and 15 g/10 min., a tensile strength of between 6000 and 9000 psi, a modulus of between 250,000 and 500,000 psi, a flexural strength of between 8000 and 16,000 psi, a flexural modulus of between 300,000 and 500,000 psi, a Vicat softening point of between 180° F. and 240° F., and an annealed heat distortion of between 170° F. and 220° F.

* * * * *